Figure 1:
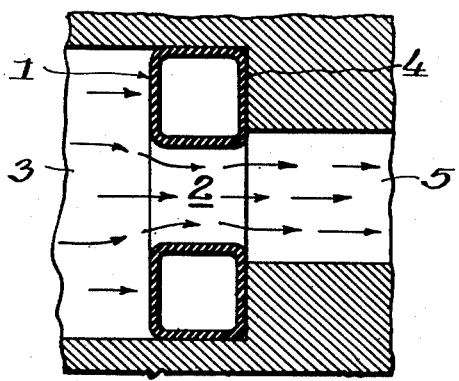

Sept. 18, 1951     T. R. SMITH     2,568,519

AUTOMATIC FLOW REGULATOR

Filed Jan. 16, 1946

INVENTOR.
Thomas R. Smith
BY
Parkinson Lane
Attys.

Patented Sept. 18, 1951

2,568,519

UNITED STATES PATENT OFFICE 2,568,519

AUTOMATIC FLOW REGULATOR

Thomas R. Smith, Newton, Iowa, assignor to The Maytag Company, Newton, Iowa, a corporation of Delaware Application January 16, 1946, Serial No. 641,527

1 Claim. (Cl. 138—45)

The present invention relates to a flow valve and especially to a novel type of flow valve for automatically controlling the flow of a fluid through an orifice.

Among the objects of the present invention is the provision of novel type of flow valve so constructed and arranged as to limit or constrict the flow of a fluid through a passage as pressure behind the flow is increased. This is accomplished by providing a novel valve with an orifice which automatically decreases in size as the pressure behind the flow increases.

In many installations it is desirable either to limit the flow of fluid through an orifice or to maintain a constant flow of the fluid regardless of the pressure behind this flow. In a line or conduit for supplying water for household or industrial purposes, it will frequently be found that the pressure may vary between 20 to 120 pounds and for certain purposes it is desirable to maintain a constant flow through an orifice of a predetermined number of gallons per minute regardless of the pressure of the incoming stream. Such varying pressures are found not only in the water systems in different sections of the country, but will frequently be found in the same system under various conditions.

One such example is the supply of water to an automatic type of washing machine where the amount or quantity of water for washing or rinsing purposes that is permitted to flow into a container or tub is intended to be controlled by the time the valve is open. In such constructions it is highly desirable to have a constant flow valve in order that the amount of water supplied thereto in a given period will be the same regardless of the pressure in the water system.

It is, therefore, an important object of the present invention to provide a novel flow valve that will supply a predetermined quantity of water or other fluid regardless of the pressure in the system.

Further objects are to provide a construction of maximum simplicity, efficiency, economy and ease of assembly and operation; and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings—

Figures 1, 2, 3, 4 and 5 disclose alternate constructions of flow valves each having an orifice or passage which due to its novel construction and arrangement automatically decreases in size as the pressure of the supply or incoming stream increases.

Referring more particularly to the novel illustrative embodiments disclosed in the drawings, there is shown a flow valve which may be formed or contoured in various shapes but in each of which it is formed of a flexible and resilient material such as natural or compounded synthetic rubber and provided with a centrally disposed orifice for passage of the fluid under pressure.

In Fig. 1 is disclosed a flow valve 1 of substantially toroidal shape having an orifice or passage 2 therethrough. This orifice is adapted to decrease in size as the pressure of the water or other fluid increases. In this form of the invention, the toroidal element is shown hollow and of approximately square or rectangular cross-section and disposed in the passage 3 with one side thereof abutting or seating against a shoulder 4 at the reduced outlet or passage 5. As the resilient element or flow valve 1 is disposed in the path of the fluid flow and held against the shoulder 4 by the pressure of the fluid, the orifice 3 decreases or constricts as the pressure of the flow increases.

Figure 2:
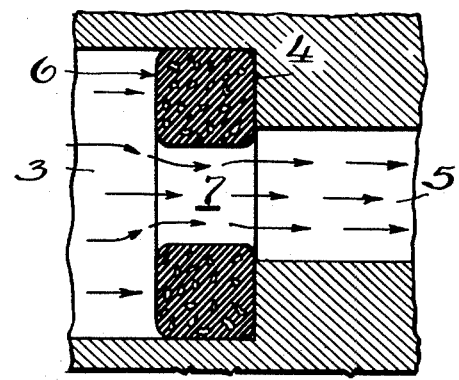

Fig. 2 discloses another form of toroidal member or flow valve 6 formed or molded of sponge or air foam type of natural or compounded synthetic rubber. Like the construction shown in Fig. 1, it is provided with an orifice or opening 7 and seats against the shoulder 4.

Figure 3:
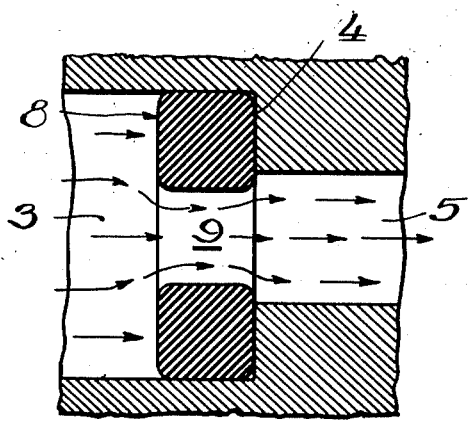

The construction shown in Fig. 3 is similar to that shown in Fig. 2 except that the member or flow valve 8 is preferably formed of solid natural or compounded synthetic rubber and provided with an orifice or opening 9 therethrough, and with the member 8 seating or abutting the shoulder 4 and held thereagainst by the pressure of fluid in the system. The wall section, texture and resiliency of the rubber or rubber-like material are determined by the application thereof and molded or compounded to meet these requirements. In all events, it must have sufficient flexibility and resiliency to meet such requirements with the opening adapted to be constricted to such a degree as to automatically limit the passage of fluid therethrough.

Figure 4:
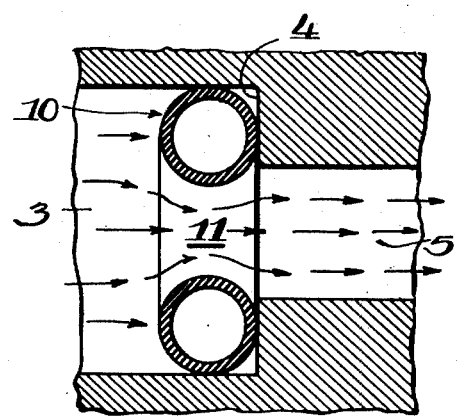

In Fig. 4 is shown another form of toroidal element or flow valve 10 which is of circular and hollow cross-section. It, like the preceding shapes, may be constructed or fabricated of any suitable natural or compounded synthetic rubber having the desired resiliency and flexibility. This member is provided with an opening or orifice 11 which will automatically constrict and control the passage of fluid therethrough as the pressure increases.

Figure 5:
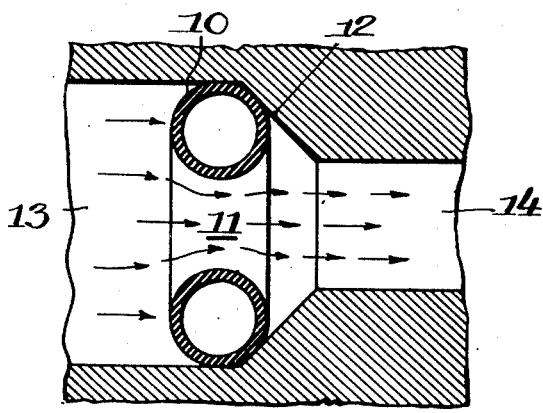

The construction of toroidal element or flow valve 10 shown in Fig. 5 is similar to that shown in Fig. 4, but seats against a conical surface 12 merging or tapering from the enlarged passage 13 on the intake or upstream side, into a reduced passage 14 on the downstream side. This valve, like the others, is preferably formed of natural or compounded synthetic rubber having sufficient inherent flexibility and resiliency as to automatically constrict the orifice or opening 11 upon an increase in pressure of the incoming fluid.

The constructions of flow valves shown in Figs. 1, 2, 3 and 4 are actuated by the pressure differential between the Venturi throat and the exposed upstream face of the toroidal member, while that shown in Fig. 5 is actuated by a combination of the Venturi effect and the wedging action on the conical surface 12, both acting or functioning to contract the opening or orifice 11 in the toroidal element 10.

Whether the toroidal element is circular or substantially square in cross-section, it is so constructed and arranged as to be held by the pressure of incoming fluid against a shoulder, constriction or reduced cross-section in the passage or conduit for the fluid. With extremely low pressures, this toroidal element will not become distorted or deformed and the orifice or opening therethrough will remain constant. As the pressure increases, the flow of fluid tends to increase, thereby causing the pressure against the side of the toroidal element to increase and to flatten out and distort to thereby reduce the size of the central control opening or orifice. Further increase in the pressure of the entering fluid causes a further reduction in the size of the opening and thereby giving an accurate and automatic flow control of the fluid passing through the opening.

These toroidal elements may be hollow as shown in Figs. 1, 4 and 5, and when hollow, may be filled with a gas or other fluid at any suitable pressure, or they may be made of resilient sponge material or air foam type of rubber or rubber-like material as shown in Fig. 2, or of a solid cross-section of natural or compounded synthetic rubber having the desired resiliency and flexibility as in Fig. 3.

As shown in Figs. 1, 2, 3 and 4, the toroidal shaped member is seated or rests against an abrupt shoulder 4, while in Fig. 5, the toroidal element rests or seats against a tapered or conical surface 12 whereby any increase in pressure tends to force the element along this conical surface and thereby restrict the opening or orifice for passage of the fluid. In this form of the invention, the toroidal member or flow valve is actuated by a combination of the pressure against the exposed upstream face thereof and a reduction in pressure through the orifice due to the Venturi effect and to the wedging action along the conical surface through movement of the element with the direction of flow.

The hollow toroidal element may be made integral or to facilitate molding, may be made of complementary sections or halves which may be suitably joined together, especially where the valve or element is to contain a gas or other fluid. As the pressures of the fluid in the system are symmetrical or affect the valve uniformly throughout, the sections or separate parts of the element, when formed separately, operate as a complete or integral unit, so that if the element does not contain a gas or other fluid, these sections need not be joined or made integral.

In view of the above description and the disclosure in the drawings, it will be readily apparent that the invention comprehends a novel flow valve which will automatically restrict or limit the flow of a fluid through an orifice. Furthermore, numerous uses or applications of this invention will readily suggest themselves as it may be employed wherever it is desired to limit the flow of a fluid through an orifice or to hold the flow to a constant value regardless of the pressure.

Having thus disclosed my invention, I claim:

A fluid flow valve for maintaining substantially constant the flow of fluid under variable pressure conditions, comprising a body member having a passage therethrough with a frusto-conical shoulder therein forwardly and inwardly inclined in the direction of flow of the fluid, and a floating hollow toroidal resilient member having a fluid sealed therein disposed in the passage and seated against the shoulder by the pressure of the fluid, said member being provided with a central orifice defining a Venturi throat through which the incoming fluid flows and which decreases in area as the pressure of the incoming fluid acting on the upstream side of said member increases to thereby maintain the total flow therethrough substantially constant.

THOMAS R. SMITH.

REFERENCES CITED

The following references are of record in the file of this patent:

UNITED STATES PATENTS

| Number | Name | Date |
|---|---|---|
| 1,657,663 | Devereux | Jan. 31, 1928 |
| 2,188,366 | Lindstaedt | Jan. 30, 1940 |
| 2,389,134 | Brown | Nov. 20, 1945 |
| 2,409,294 | Martin | Oct. 15, 1946 |
| 2,409,433 | Hunter | Oct. 15, 1946 |
| 2,454,929 | Kempton | Nov. 30, 1948 |
| 2,464,917 | Babson | Mar. 29, 1949 |